United States Patent
Bapst et al.

(10) Patent No.: US 7,690,099 B2
(45) Date of Patent: Apr. 6, 2010

(54) TRANSFORMATION STATION FOR A PACKAGING PRODUCTION MACHINE

(75) Inventors: Sylvain Bapst, Morlon (CH); Philippe Clement, Penthalaz (CH)

(73) Assignee: Bobst S.A. (CH)

( * ) Notice: Subject to any disclaimer, the term of this patent is extended or adjusted under 35 U.S.C. 154(b) by 902 days.

(21) Appl. No.: 11/449,504

(22) Filed: Jun. 8, 2006

(65) Prior Publication Data

US 2006/0281613 A1 Dec. 14, 2006

(30) Foreign Application Priority Data

Jun. 10, 2005 (EP) ................... 05012515

(51) Int. Cl.
*B31B 49/00* (2006.01)
*B23P 23/00* (2006.01)
(52) U.S. Cl. .................. 29/560; 493/471; 493/475; 493/478; 493/479; 83/331; 83/343; 83/346; 29/564
(58) Field of Classification Search .............. 29/564, 29/560, 33 S, 33 Q; 483/28–29; 493/471, 493/473, 475, 477, 478, 479; 83/331, 343, 83/344, 346; 100/155 R, 168
See application file for complete search history.

(56) References Cited

U.S. PATENT DOCUMENTS 3,566,734 A * 3/1971 Robinson ................. 83/346
4,095,498 A * 6/1978 Biggar, III ................ 83/346
4,542,671 A * 9/1985 Kesten .................... 83/343
5,598,758 A * 2/1997 Chmelar .................. 83/346
5,657,529 A * 8/1997 Bohn et al. ............... 29/33 Q
5,842,399 A * 12/1998 Pfaff, Jr. .................. 83/343
7,517,309 B2 * 4/2009 De Matteis ............. 493/477
7,555,823 B2 * 7/2009 Arai ....................... 29/560
2005/0119099 A1 * 6/2005 Madern ................. 493/144

FOREIGN PATENT DOCUMENTS

| EP | 271229 A1 * | 6/1988 |
| EP | 1 331 054 A2 | 7/2003 |
| EP | 1 537 920 A1 | 6/2005 |
| FR | 2 819 744 A1 | 7/2002 |

OTHER PUBLICATIONS

European Search Report EP 05 01 2515 dated Nov. 11, 2005.

* cited by examiner

*Primary Examiner*—Erica E Cadugan
(74) *Attorney, Agent, or Firm*—Ostrolenk Faber LLP

(57) ABSTRACT

A transformation station for a packaging production machine comprises side frames between which tool-carrier cassettes are mounted. The side frames support slides on which members slide for the mounting of the tool-carrier cassettes. The members for mounting the tool-carrier cassettes comprise cassette supports that can be moved in opposition across and according to material advancing direction dimensions of the tool-carrier cassettes. The cassette supports are fitted with first devices for attaching in position the cassette supports and second devices for locking the tool-carrier cassettes to the supports.

10 Claims, 6 Drawing Sheets

TRANSFORMATION STATION FOR A PACKAGING PRODUCTION MACHINE

BACKGROUND OF THE INVENTION

The present invention concerns a transformation station for a packaging production machine, that is a machine designed for the manufacture of folding boxes from a material in a strip or in sheets.

Such packaging production machines comprise several successive transformation stations, for example, a feed station, followed by one or more printing stations, where necessary a scoring station, an embossing station, a rotary blanking station, a waste ejection station, and finally a folding box blank receiving station. Since this type of machine has a modular design, it is possible that, in a preferred configuration, a machine comprises, in addition to the feed station, the printing and blank receiving stations, only one embossing station followed by a rotary blanking station and by a waste ejection station.

The strips or sheets, for example strips or sheets of cardboard, may usually contain over their width several identical box preforms or blanks which each represent the shape and the folded-out surface area of the manufactured packaging. The number of preforms that may thus be placed side by side naturally depends on the width of the medium being worked, but also on the maximum format accepted by the machine and the size of the box blanks. Usually, the box preforms or blanks are placed at either side of the theoretical median axis of the strips or sheets being worked by the machine. The various stations of the machine are all fitted with specific tools, preferably with rotary printing, blanking, embossing and scoring tools and tools for ejecting the waste resulting from the blanking operations, whose dimensions correspond to the width of the strips or sheets being worked. For the rotary printing tools, the change of width of the strips poses no particular problems because it is sufficient to mount an appropriate die on the die-carrier cylinder. On the other hand, for the rotary blanking, embossing, scoring and ejection tools, which are mounted in cassettes, an example of which is described in patent FR 2 819 744 B1, this poses a problem associated with the construction of these cassettes. In practice, these cassettes may originate from several manufacturers chosen by the packaging producer according, for example, to advantageous cost or more advantageous wear performance. To adapt for use of cassettes from different manufacturers, a cassette adapter is used to make it possible to insert cassettes of any origin, such as the one described in patent application EP 1 331 054 A3. Currently, for each strip or sheet width, tool-carrier cassettes of corresponding width must be used. The width dimensions of a strip of cardboard, for example, may vary within a range lying between 325 and 850 mm. Usually, the most common widths used by the manufacturers of folding boxes are 550, 670, 820 and 850 mm, widths defined by the width dimensions of the box blanks to be worked. The packaging manufacturer faced with the use of several widths of cardboard strips must choose a solution, which is very costly and requires the use of considerable space in a carton production plant, and which consists in using several machines with different strip throat widths.

At the present time in the inventor's knowledge of the prior art in this field, there is no other solution making it possible to alleviate the disadvantages that unavoidably occur when using variable strip widths.

SUMMARY OF THE INVENTION

The object of the present invention is to provide to packaging producers a transformation station for a single packaging production machine, in order to allow different strip or sheet widths to be worked.

A transformation station for a packaging production machine comprises side frames between which tool-carrier cassettes are mounted. The side frames support slides on which members slide for the mounting of the tool-carrier cassettes. The members for mounting the tool-carrier cassettes comprise cassette supports that can be moved in opposition across the direction of product advancing to set the spacing of the supports according to the dimensions of the tool-carrier cassettes. The cassette supports are fitted with first devices for attaching in position the cassette supports and second devices for locking the tool-carrier cassettes.

Other objects and features of the invention are explained with reference to one embodiment that is taken to be in no way limiting and is illustrated by the appended Figures.

DETAILED DESCRIPTION OF EMBODIMENTS OF THE INVENTION

In order to define some terms routinely used in the following description to describe the orientation or location of certain portions of objects, note that the adjectives "longitudinal" and "transverse" always refer to the main axis of travel of the strip or sheet of material in the machine and that the terms "upstream" and "downstream" indicate respectively the side closest to the entrance of the machine and the side closest to the exit.

Figure 1:
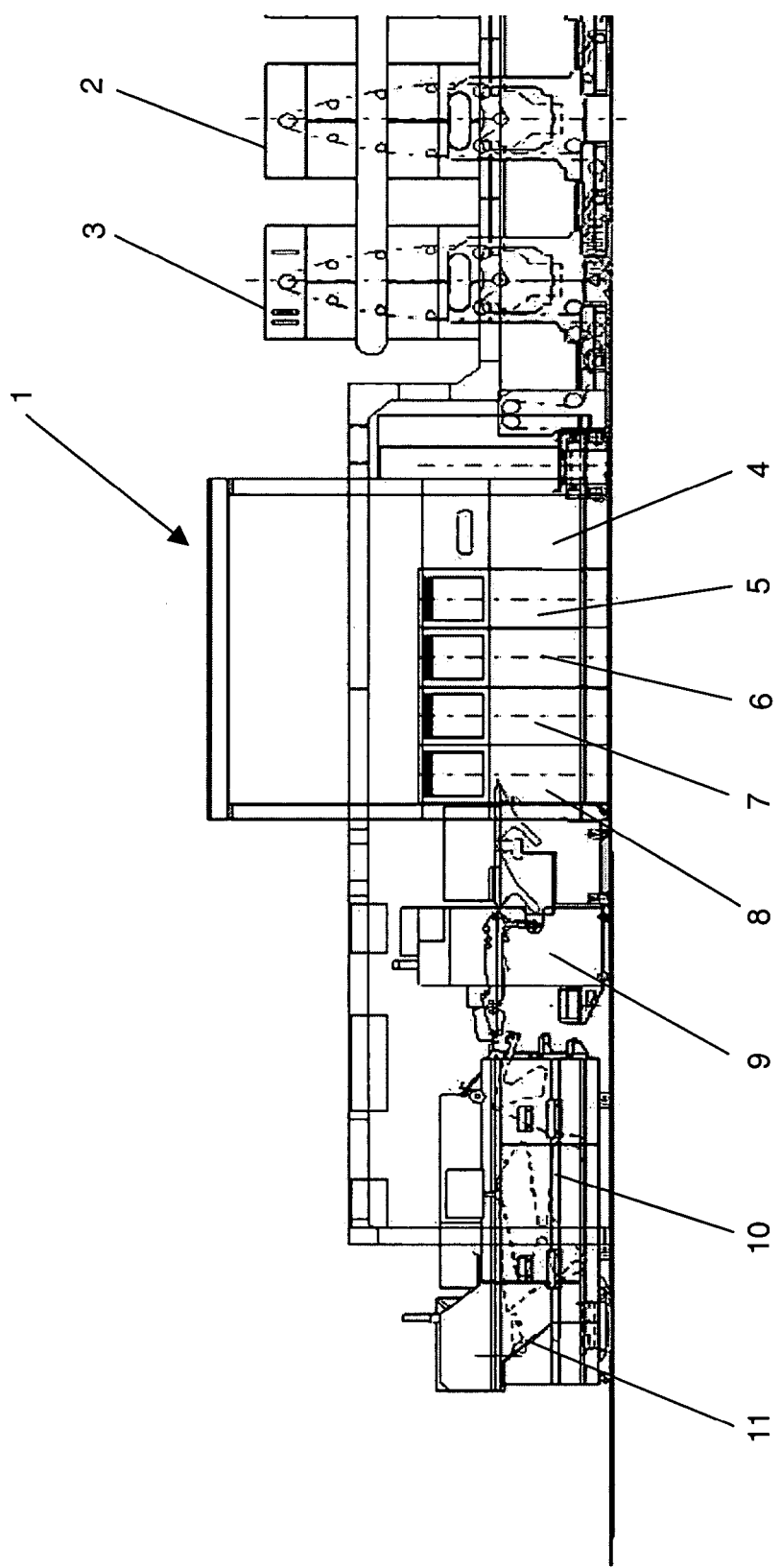
FIG. 1 represents a schematic view in profile of a packaging production machine.

FIG. 1 represents a schematic view in profile of a packaging production machine 1 in which the upstream portion situated upstream of the printer groups 2 and 3 has not been shown to simplify the present description. The present example is restricted to describing only a machine working a material in strip form. It is understood that, for a machine working a material in sheets, only specific means, well known, of conveying sheets must be used. In the packaging production machine 1, the material in a strip is printed, and after emerging from the printer groups 2 and 3, it is brought into the various stations for embossing 5, scoring 6, blanking 7 and waste ejection 8 after having passed into the insertion station 4. The resulting box blanks are then separated from one another in a known separation station 9 which uses belts in order for the blanks thereafter to be placed in bundles in the station 10 before being stacked in the stacking station 11. The portion of the machine for producing packages, such as folding boxes, that is the subject of the present invention, is at stations 5 to 8 which essentially use tool-carrier cassettes.

Figure 2:
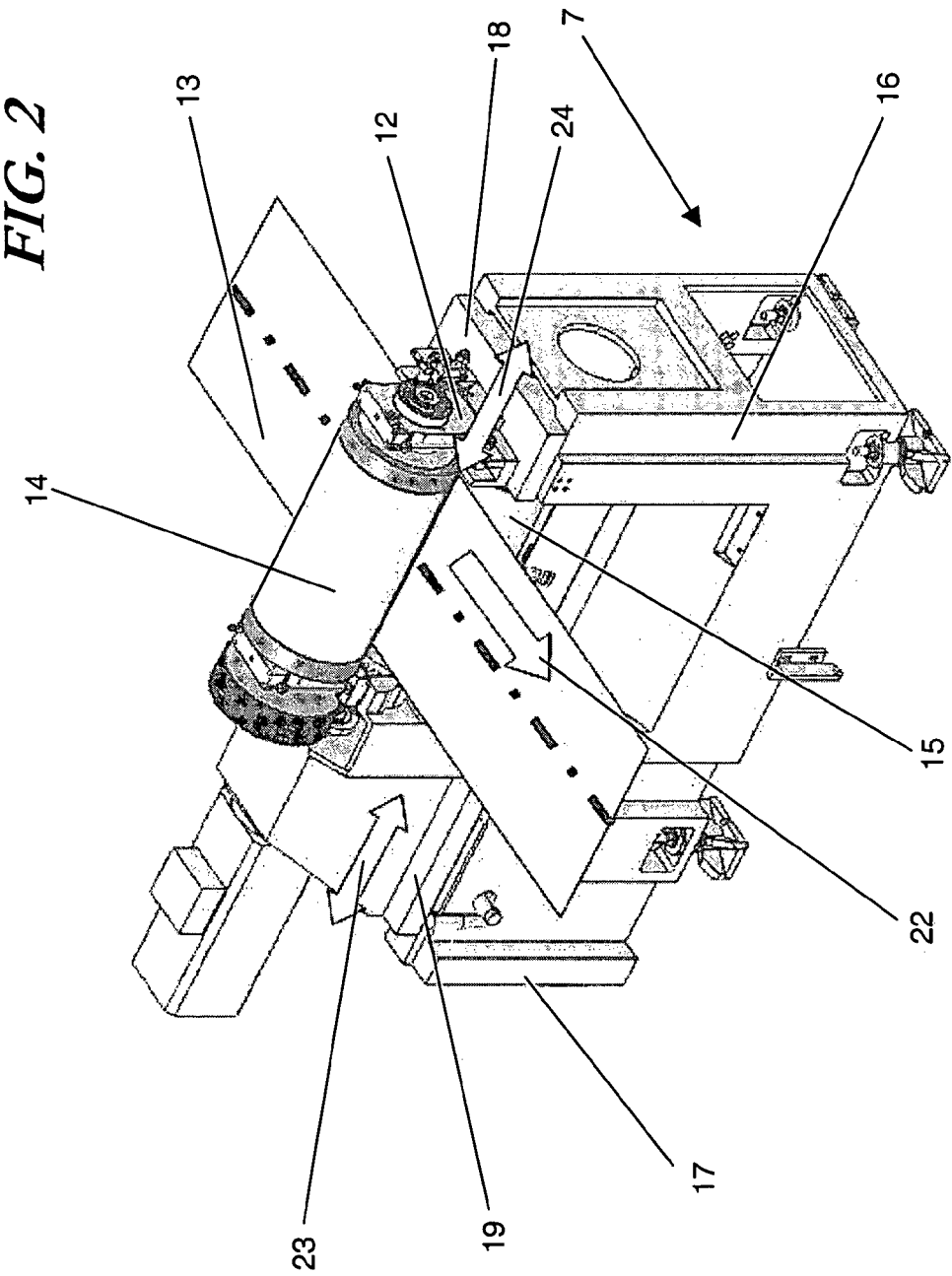
FIG. 2 represents a schematic view in perspective of a blanking station fitted with a tool-carrier cassette.

FIG. 2 represents a schematic view in perspective of a blanking station 7 fitted with a tool-carrier cassette 12. The material in a strip 13, traveling from upstream to downstream in the direction indicated by the arrow 22, is blanked by means of a top rotary blanking tool 14 acting jointly with a bottom rotary counter-tool 15. Note that the use of such cassettes allows very great precision of radial positioning of the top rotary tool 14 relative to the bottom rotary counter-tool 15. The blanking station 7 comprises side frames 16 and 17 on which are arranged bearing bases, here called cassette supports 18, 19 for the tool-carrier cassette 12 and a first device 51 for attaching cassette supports 18, 19 in position and a second device 52 for locking the tool-carrier cassette 12. The first device 51 for attaching the cassette supports 18, 19 in position and the second device 52 for locking the tool-carrier cassette 12 are fixedly attached to the cassette supports 18, 19 and will be described in greater detail with reference to FIGS. 4, 5 and 6. The cassette supports 18 and 19 can be moved, according to the cross-machine dimension of the cassette 12, in the direction indicated by the double arrows 23 and 24. The embossing station 5, scoring station 6 and waste ejection station 8 are of a construction similar to that of the blanking station 7, briefly described hereinabove, the only difference being in the tools fitting these embossing 5, scoring 6 and waste ejection 8 stations.

Figure 3:
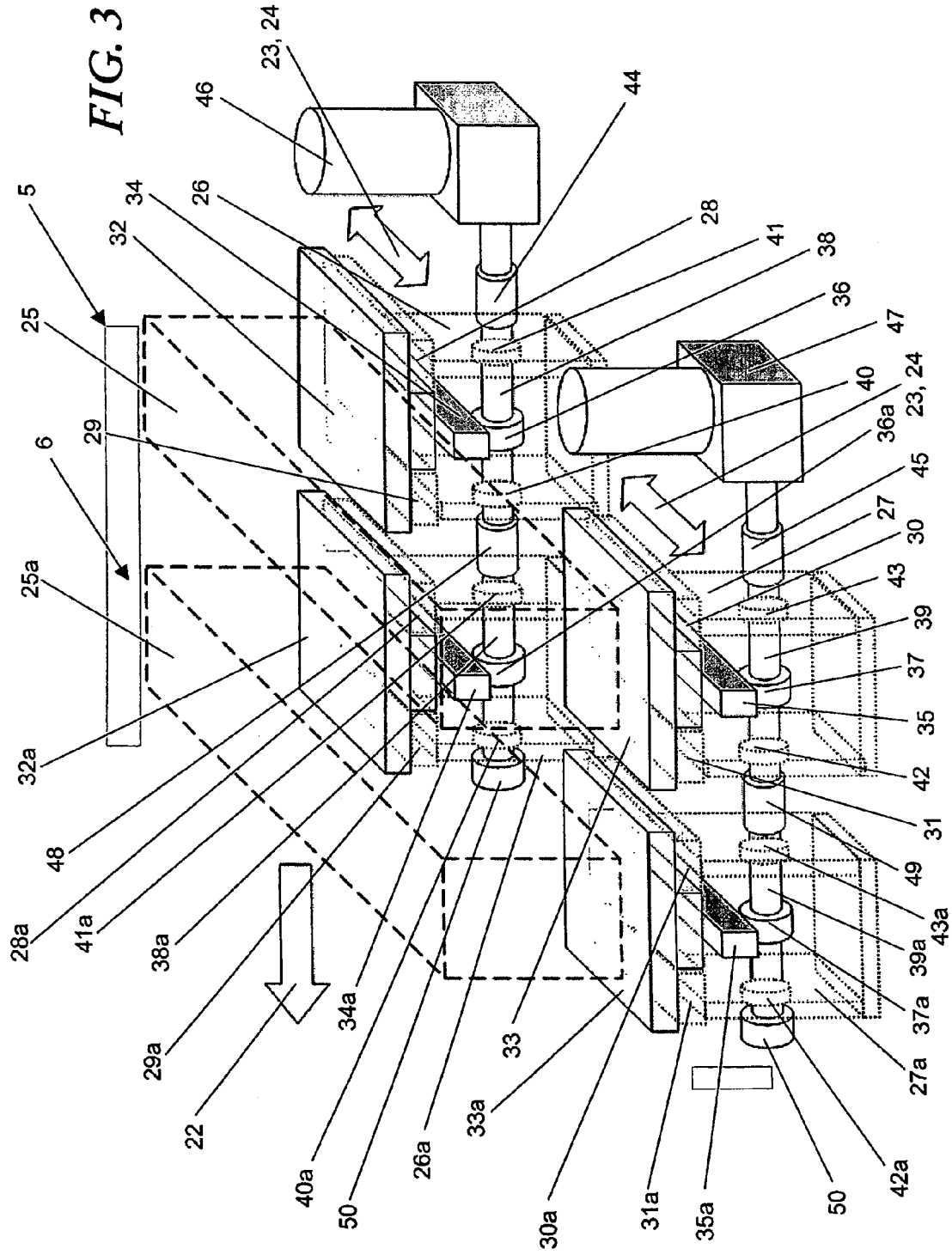
FIG. 3 represents a schematic view of the members of a mounting device for a tool-carrier cassette in two consecutive stations.

FIG. 3 represents a schematic view of the members of a device for mounting a tool-carrier cassette 25, respectively 25a in two consecutive stations, for example, the embossing station 5 and the scoring station 6. In this description, only the members of the device for mounting the tool-carrier cassette of the embossing station 5 will be taken into account; the members of the mounting devices of the scoring station 6 being identical, they carry the same reference numbers plus the letter "a". The members of the mounting devices of the blanking station 7 and the waste ejection station 8 are also identical to those of the embossing station 5 and the scoring station 6 and consequently they will not be described specifically.

For clarity of the drawing, the first device 51 for attaching the cassette supports 18, 19 in position and the second device 52 for locking the tool-carrier cassette 12, fixedly attached to the cassette supports 18, 19, will not be described in this Figure and as mentioned above in the present text, they will be described in greater detail with reference to FIGS. 4, 5 and 6.

The embossing station 5 comprises two frames 26 and 27 each fitted on their upper portion with two slides 28, 29 respectively 30 and 31. The slides 28 and 29 serve as guide members for the cassette support 32 while the slides 30 and 31 serve as guide members for the cassette support 33. The lower portion of each of the cassette supports 32 and 33 is fitted with a rack 34, respectively 35. Each rack 34 and 35 meshes with a pinion 36, respectively 37 mounted on a shaft 38, 39. Each shaft 38, 39 is supported by bearings 40, 41, 42 and 43 arranged respectively in the frames 26 and 27. The shafts 38, 39 are driven, via a coupling 44, 45, by a reduction gear motor 46, 47. The cassette supports 32 and 33 are moved across the advancing direction toward or away from the median axis of the strip material, by a value, equal for each cassette support 32 and 33, according to the dimension of the tool-carrier cassettes that are to be used. The movement in opposition of the cassette supports 32 and 33 is obtained by modifying the direction of rotation of the reduction gear motors 46, 47. Since the tool-carrier cassette 25a has dimensions identical to those of the tool-carrier cassette 25, it will be appropriate to apply, to the cassette supports 32a and 33a, a movement identical to that of the cassette supports 32 and 33. Accordingly, the shaft 39a supporting the pinion 37a, meshing with the rack 35a, will be connected to the shaft 39 by means of another coupling 48, 49. A coder, such as a pulse generator 50, will be mounted at the end of the shafts 38a and 39a or, if using a larger number of stations, the end of the respective shafts of the last station used. Note that the position of the pulse generator 50 could easily be situated at the reduction gear motor 46, 47. The information transmitted by the pulse generators will be stored so that the adjustments for a given dimension of cassette may be reproduced during repetitive work.

Figure 4:
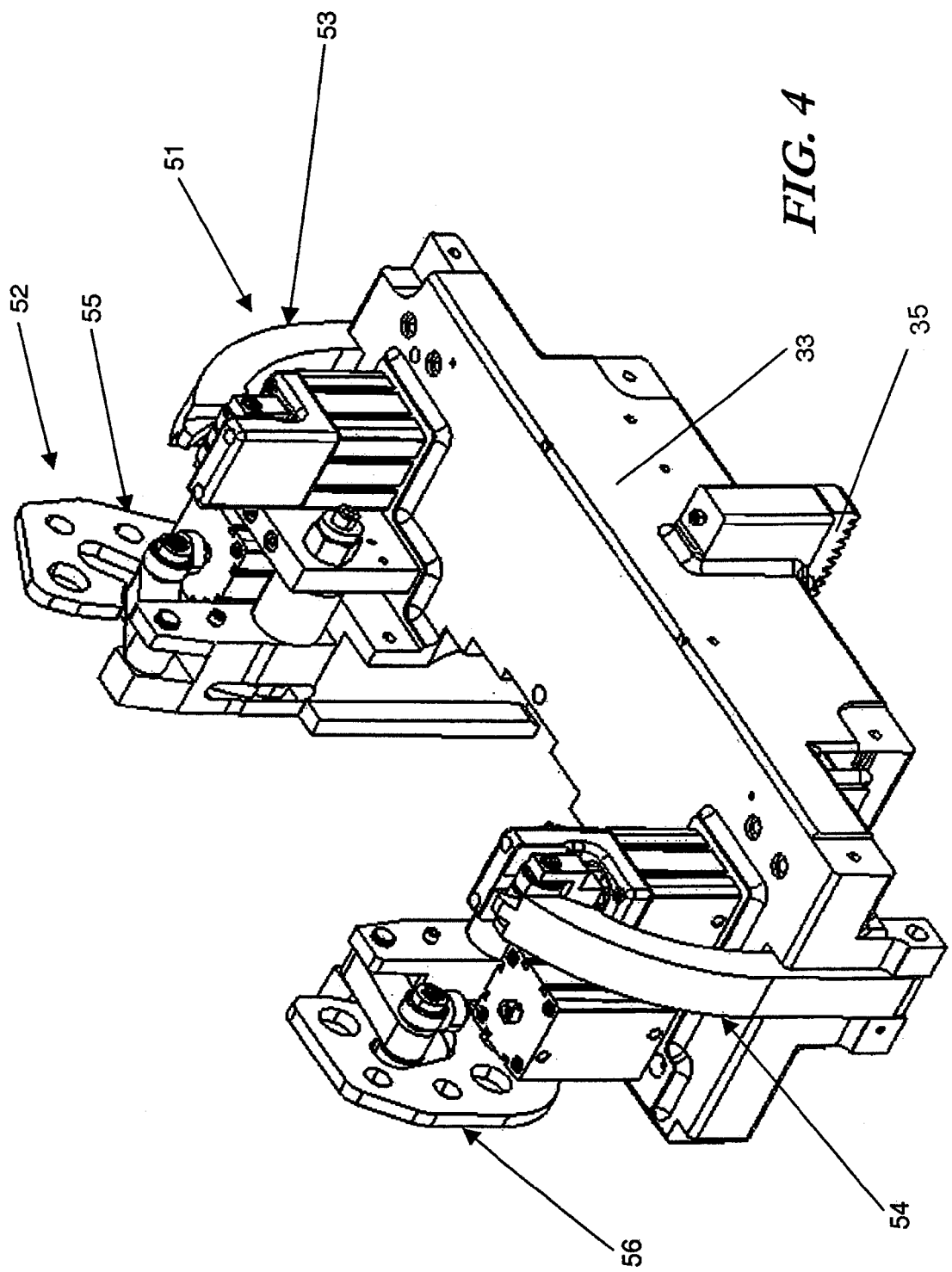
FIG. 4 represents a schematic view in perspective of the members of a device for attaching a tool-carrier cassette support and a device for locking a tool-carrier cassette.

FIG. 4 represents a schematic view in perspective of the members of a first device 51 for attaching a tool-carrier cassette support 33 and a second device 52 for locking a tool-carrier cassette. In this Figure, only the members of the first device 51 for attaching a tool-carrier cassette support 33 and the second device 52 for locking a tool-carrier cassette (not shown) fixedly attached to the cassette support 33 have been shown, because the members of the device for attaching a tool-carrier cassette support and a device for locking a tool-carrier cassette fixedly attached to the cassette support 32 are identical. A simple mounting in opposition represents the difference relative to the present FIG. 4. The device 51 for attaching the tool-carrier cassette support 33 comprises two clamping members 53 and 54 placed symmetrically relative to the median axis of the tool-carrier cassette support 33. The same applies to the two locking devices 55 and 56 of the device 52 for locking a tool-carrier cassette. The rack 35 of the cassette support 33 is visible at the bottom portion of this cassette support 33.

Figure 5:
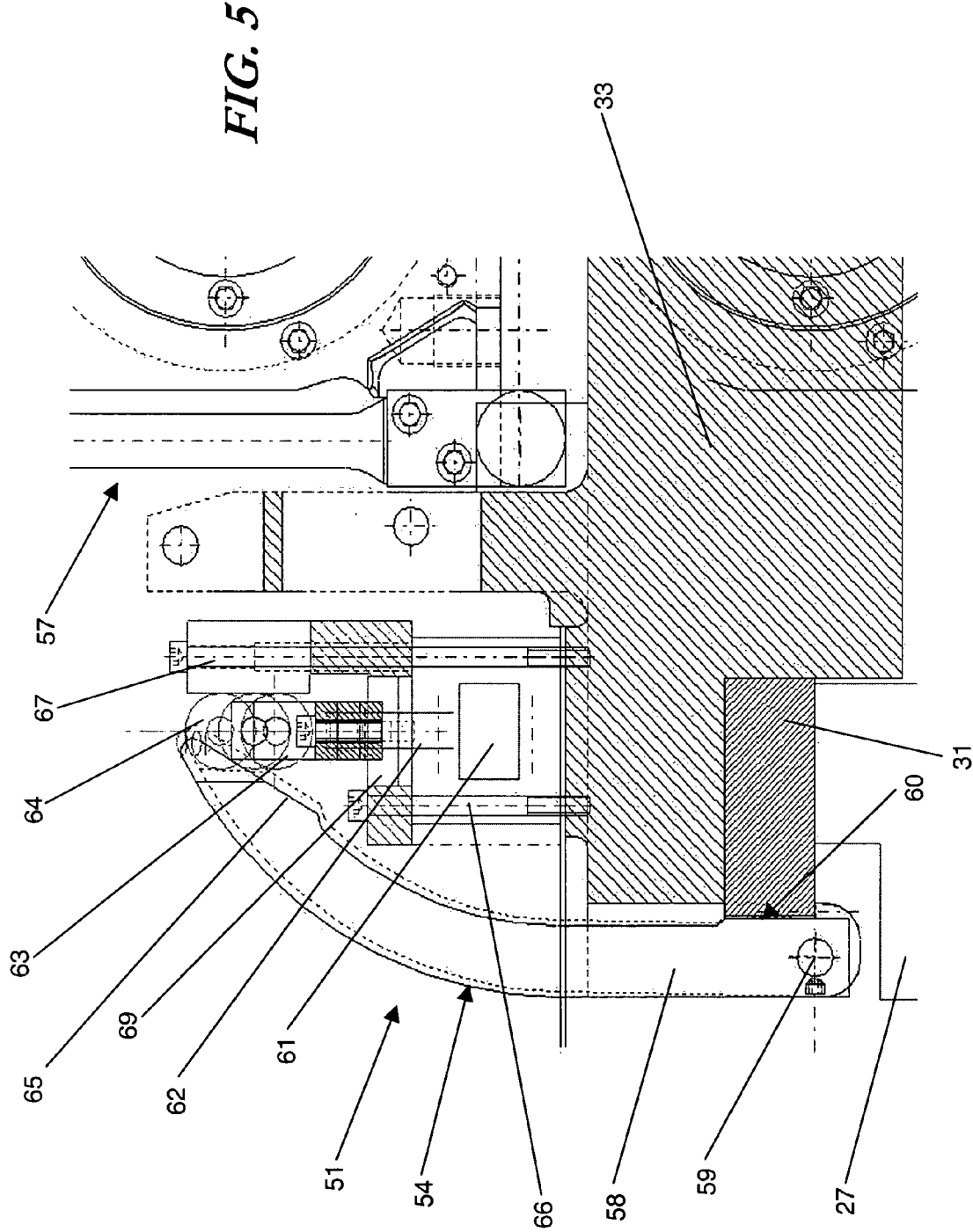
FIG. 5 represents a view in profile of the members of the left portion of a device for attaching a tool-carrier cassette support.

FIG. 5 represents a view in profile of the members of the left portion of the first device 51 for attaching the cassette support 33. The members of the right portion of the device 51 for attaching the cassette support 33 are identical and will therefore not be described. The cassette support 33, sliding on the slide 31 mounted on the upper portion of the frame 27, having been moved transverse to the advancing direction of travel of the strip of cardboard 13 (see FIG. 2) according to the width of the cassette 57 (partially shown) by means of the members of the cassette mounting device described with reference to FIG. 3, must be locked in position with the aid of the attachment device 51. Accordingly, the attachment device 51, arranged substantially on the rear portion of the cassette support 33 (see FIG. 4), comprises a clamping member 54 comprising a lever 58 articulated about a shaft 59 arranged in a boss fixedly attached to the cassette support 33. The lever 58 has, on its lower portion, a flat surface 60 which, when the cassette support 33 is locked in position, will apply a clamping force against the slide 31. This clamping force is obtained via a pneumatic cylinder 61 whose output rod 62 is fitted with a shoe 63 onto which is mounted a roller 64 acting against the inclined upper portion 65 of the lever 58. The roller 64 attached to the shoe 63 is guided by a runner 68 mounted on the yoke 69 supporting the pneumatic cylinder 61 in order to prevent an undesired stress on the output rod 62 of the pneumatic cylinder 61. The pneumatic cylinder 61 is attached to the cassette support 33 with the aid of screws 66 and 67.

Figure 6:
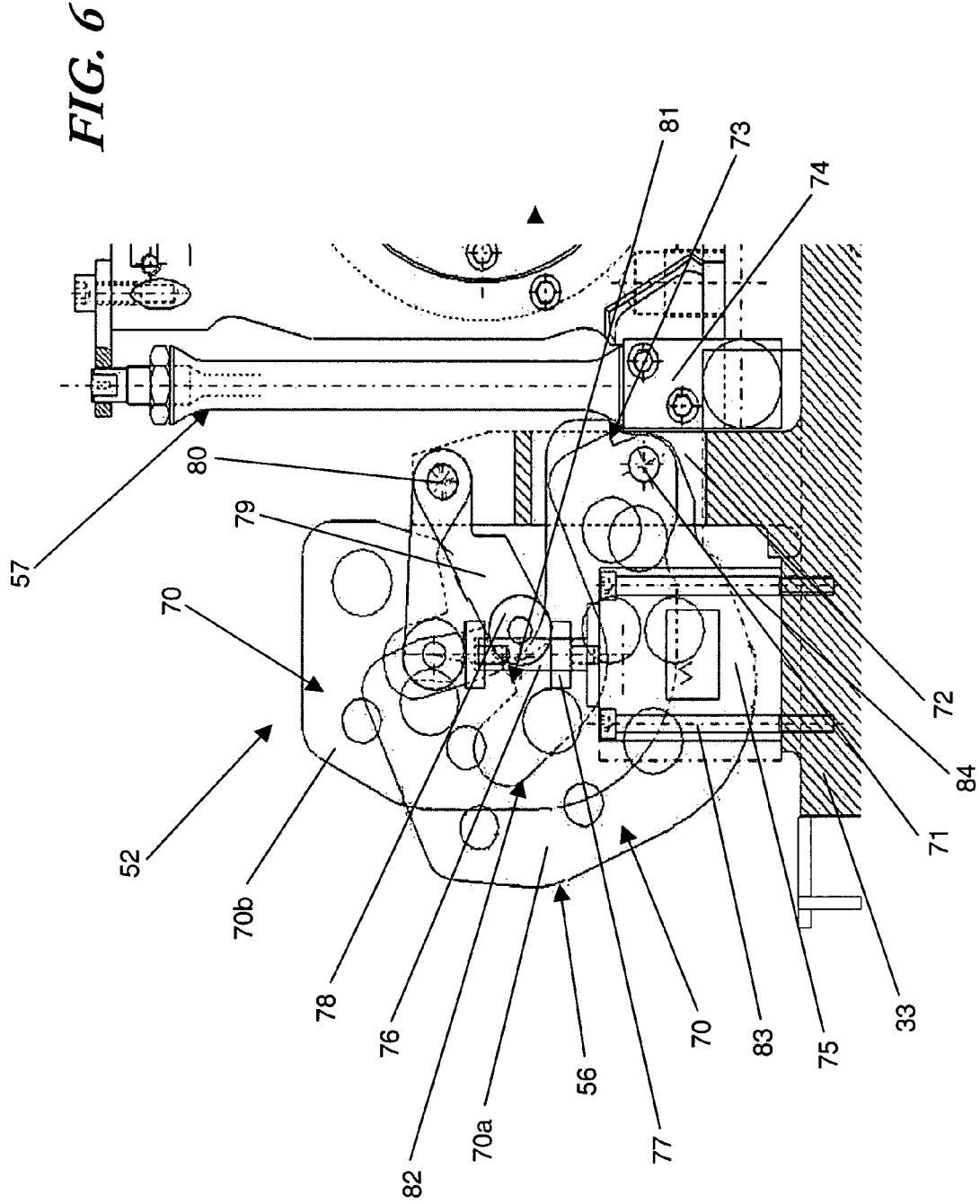
FIG. 6 represents a view in profile of the members of the left portion of a device for locking a tool-carrier cassette.

FIG. 6 represents a view in profile of the members of the left portion of the second device 52 for locking a tool-carrier cassette 57. The members of the right portion of the device 52 for locking a tool-carrier cassette 57 are identical and will therefore not be described. The cassette support 33, having been moved transverse to the direction of travel of the strip of cardboard 13 (see FIG. 2) according to the width of the cassette 57 (partially shown) by means of the members of the cassette mounting device described with reference to FIG. 3, must be locked in position with the aid of the attachment device 51. The cassette 57 then has to be locked by means of the locking device 52. Accordingly, the locking device 52, arranged substantially on the front portion of the cassette support 33 (see FIG. 4), comprises a locking member 56 comprised of a lever 70 articulated about a shaft 71 arranged in a boss 72 fixedly attached to the cassette support 33. The lever 70 has, at its bottom portion, a bearing surface 73 which will lock the cassette 57 by pressing the top portion of the lug 74 of the cassette 57 under the effect of the pneumatic cylinder 75. In this Figure, the lever 70 is represented, on the one hand, in its open position 70a and, on the other hand, in its locked position 70b. The output rod 76 of the pneumatic cylinder 75 is fitted with a shoe 77 which acts against a roller 78 mounted at one of the ends of a pivoting lever 79 articulated about a pivot 80 arranged in the top portion of the boss 72 of the cassette support 33. In the open position 70a of the lever 70, the roller 78 will be in contact with an inclined plane 81 of the lever 70. During the locking operation, the pneumatic cylinder 75 will cause the pivoting lever 79 to pivot so that the roller 78 rolls along the inclined plane 81 and engages in a locking notch 82 arranged in the lever 70, to lock the cassette 57 without clearance. The geometry of the lever 70 and of the pivoting lever is chosen in order to multiply the forces applied to the top portion of the lug 74 of the cassette 57. The pneumatic cylinder 75 is attached to the cassette support 33 with the aid of the screws 83 and 84.

The same members as those of the second locking device 52 may be employed when using a cassette adapter such as that described in the European patent application cited in the introduction of the present application because this adapter has a lug identical to the lug 74 of the cassette 57.

The main advantage achieved by such a device for the mounting of tool-carrier cassettes in the stations of a packaging production machine lies essentially in the fact that it is possible to work, with one and the same machine, different widths of strips or sheets by allowing the use of tool-carrier cassettes adapted to the widths of strips or sheets defined by the user.

Many enhancements may be made to the device of this invention within the framework of the claims.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A transformation station for a packaging production machine, comprising:

side frames between which a tool-carrier cassette is to be mounted, cassette supports, the supports being selectively movable on slides supported on the side frames, via a driving arrangement that engages an underside of each of the supports, in opposition toward or away from each other according to dimensions of the tool-carrier cassette such that the tool carrier cassette is supported by the supports, first devices operable for attaching in position the cassette supports on the slides; and second devices operable for locking the tool-carrier cassette to the cassette supports.

2. The transformation station of claim 1, wherein the side frames have upper positions on which the slides are arranged.

3. The transformation station according to claim 1, wherein the driving arrangement includes a rack for each cassette support; a meshing pinion for each rack, each pinion mounted on a shaft, and a respective reduction gear motor operable for rotating the pinions, the pinions engaging the racks and operable to adjust the positions in opposition of the racks and of the cassette supports on the racks.

4. The transformation station of claim 3, further comprising bearings arranged in walls of the side frames and the shafts are supported in the bearings.

5. The transformation station of claim 4, further comprising a pulse generator fitted at the ends of each of the shafts.

6. The transformation station of claim 1, wherein each first device for attaching in position the cassette supports comprises a clamping member comprising a first lever attached to a respective one of the cassette supports and movable to engage the respective cassette support to the respective slides.

7. The transformation station of claim 6, wherein each first lever has a lower portion that comprises a flat surface shaped and positioned to apply a clamping force against one of the slides and a pneumatic cylinder attached to the respective cassette support and operable for causing the lever to apply the clamping force.

8. The transformation station of claim 1, wherein each second device for locking the tool-carrier cassette comprises a locking member comprising a second lever articulated about a shaft arranged in a boss fixedly attached to the respective one of the cassette supports.

9. The transformation station of claim 8, wherein each second lever has a lower portion comprising a bearing surface shaped and positioned to be operable for locking the respective cassette by pressing the upper portion of a lug of the respective cassette and a pneumatic cylinder attached to the respective cassette support for operating the lever to press on the lug.

10. The transformation station of claim 9, wherein each second lever comprises a locking notch, a roller mounted on a pivoting lever articulated about a pivot arranged in the upper portion of the boss of the respective cassette support and operable to engage in the notch.

* * * * *